March 17, 1931. T. THOMPSON 1,796,732
WATER TURBINE
Filed May 9, 1929 3 Sheets-Sheet 3

Inventor.
Thomas Thompson.
By Watson E. Coleman.
Attorney

Patented Mar. 17, 1931

1,796,732

UNITED STATES PATENT OFFICE

THOMAS THOMPSON, OF BLACKHEATH, LONDON, ENGLAND

WATER TURBINE

Application filed May 9, 1929, Serial No. 361,689, and in Great Britain August 27, 1928.

The present invention relates to improvements in water turbines for either high or low pressure water falls, and has for its object to obtain greater mechanical efficiencies than hitherto attained by utilizing the energy of the head of water available to the fullest possible advantage.

With this object in view, use is made according to this invention of a rotor having two or more distinct sets of runner blades upon which the water is caused to act in succession and the water on leaving one set of blades is directed to the next set of blades by way of stream lined chambers formed in the stator or body of the turbine. These chambers hereinafter referred to as re-directing chambers which take the form of annular depressions in the internal wall of the turbine casing, have concave inner faces substantially toroidal in shape, so that the water emerging from one set of rotor blades is re-directed to the next set of blades without undue loss of energy.

Each re-directing chamber normally occupies a position midway between the two sets of runner blades with which it cooperates. The rotor may be formed with curved wall annular depressions within each of which a set of runner blades is disposed or if preferred one set of blades may be in the form of a screw propeller of any known type. The control of the operation of the turbine may be effected by a gate composed of tangentially disposed pivoted vanes or means may be provided whereby the regulation of the water flow is effected by traversing the rotor axially within the stator or casing.

The turbine may be arranged with its axis vertical, horizontal or inclined according to requirements. The invention also provides means whereby the axial thrust set up in the rotor shaft may be compensated entirely or in part by suction or vacuum action.

The invention will be more fully explained with reference to the accompanying drawings which illustrate more or less diagrammatically certain constructional examples of the improved turbine.

In these drawings:—

Figure 1:
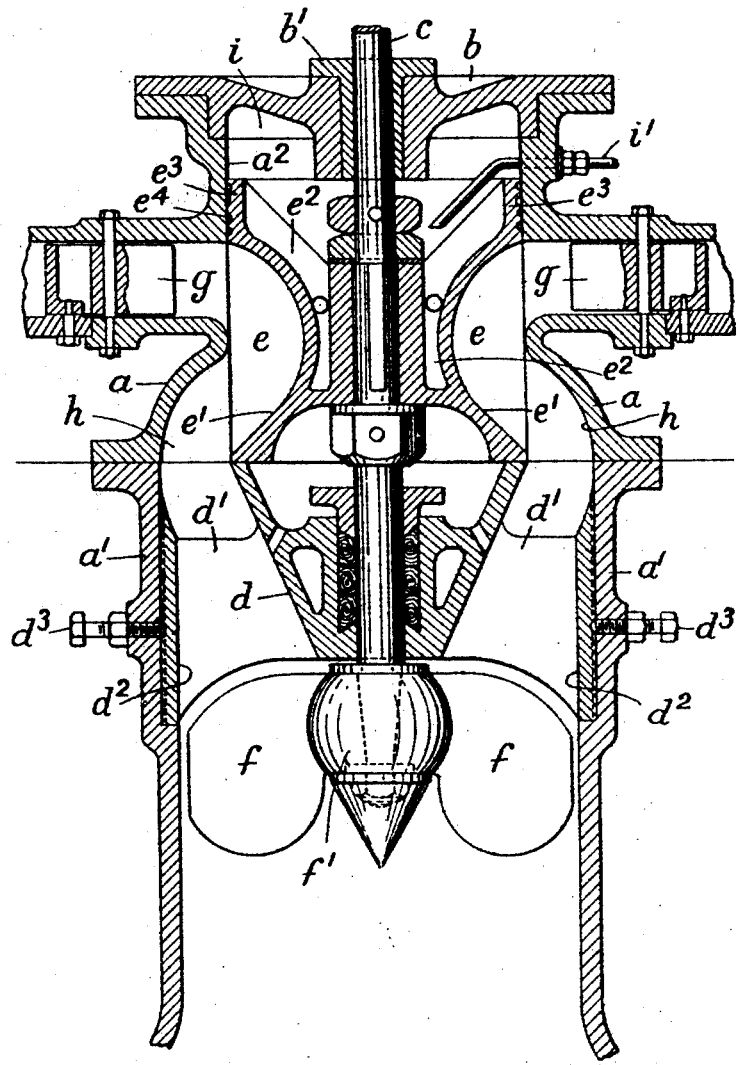
Fig. 1 is a sectional elevation of a water turbine having two sets of rotor blades and showing suction or vacuum operated rotor thrust balancing means.

In the example shown in Fig. 1 the turbine stator or casing is composed of upper and lower parts $a$ and $a'$ adapted to be bolted together, the upper part having its head closed by a removable cover $b$ with a central stuffing box $b'$ for the rotor shaft $c$, while the lower part is formed with a central shaft bearing $d$ supported by webs $d'$ projecting inwardly from an integral cylindrical wall $d^2$ removably held in the lower part $a'$ of the casing by stud bolts $d^3$. The rotor which is easily removable from the casing comprises two sets of runner blades $e$ and $f$ arranged above and below the bearing $d$ respectively, the sets of blades $e$ being located within a curved walled annular depression $e'$ formed about the periphery of a hollow core $e^2$ while the other blades $f$ are substantially helical and formed upon a central boss $f'$ in the manner of a screw propeller. The upper blades $e$ on the rotor should preferably be angled but very slightly from the vertical so as to impede the descent of the flowing column as little as possible, their purpose being directive and not so much for power production as to cause the gyration of the said column for the stronger and better impingement of the water against the blades on the secondary portion of the rotor, the angle of the blades of which can be adjusted to deal with the critical speeds to the greatest advantage.

Water is admitted to the turbine between adjustable tangentially disposed pivoted gates $g$ at a point level with the upper part of the runner blades $e$, these gates imparting a rotary or whirling motion to the water so that it is projected more or less normally to the blades $e$ and acts in turning the rotor.

During operation of the turbine the water entering between the blades $e$ the annular depression $e'$ in the rotor gradually acquires a downward and then an outward movement and is discharged from the first set of blades $e$ in the direction of the stator. Now in order that this water discharged from the first set of runner blades may be conveyed to the next set of blades effectively and with a minimum loss of energy, this invention provides in the stator the improved stream lined re-directing chamber $h$ formed as an annular depression with concave walls extending peripherally around the interior of the stator. The radius of curvature of this chamber would vary according to the head of water, but in all cases should be as large as circumstances permit. This chamber receives the water from the turbine runner blades $e$ and turns it smoothly and with but slight loss of energy to a direction towards the secondary runner blades $f$.

The upper part $e^3$ of the rotor may be made cylindrical and fitted closely into a cylindrical bore $a^2$ at the head of the stator or casing. To render fluid-tight the rubbing contact between these parts the rotor may be formed with one or more peripheral grooves $e^4$ in the casing to maintain a liquid seal. The enclosed space $i$ above the head of the rotor may if desired be connected as through a pipe $i'$ with a vacuum or suction pump or reservoir to relieve the thrust bearing of the axial thrust due to the weight of the rotor and the impact of the water thereon.

Figure 2:
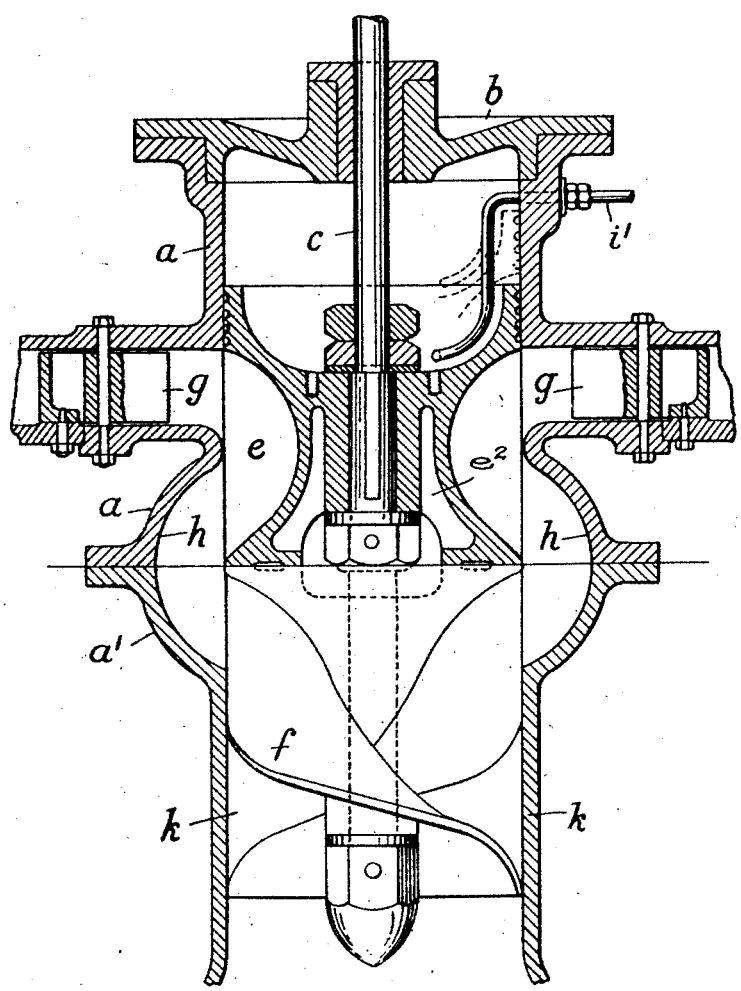
Fig. 2 is a sectional elevation of a water turbine with two sets of rotor blades wherein control can be effected by traversing the rotor axially.

In the example shown in Fig. 2, sufficient clearance is provided in the upper part $a$ of the stator or casing to permit of the rotor and its shaft being raised bodily in the casing for example by suitable mechanism attached to the thrust bearing supporting the rotor shaft and the lower rim of the rotor core $e^2$ is of such a diameter that when lifted it co-operates with the internal wall of the stator and acts as a cut off valve to close the water passage through the turbine. As will be seen this rotor lifting mechanism can be used either for regulating the operation of the turbine as for shutting down the water supply completely when desired.

It will also be seen that in the construction illustrated in Fig. 2 it is only necessary to remove the cover $b$ to enable the complete rotor to be removed without disturbing the casing in any way.

The upper blades $e$ of the rotor are similar to those shown in Fig. 1 but the lower blades $f$ are shown relatively elongated and would be disposed in staggered relation to the upper blades $e$. These blades depend down the draught tube $k$ below the re-directing chamber $h$.

Figure 3:
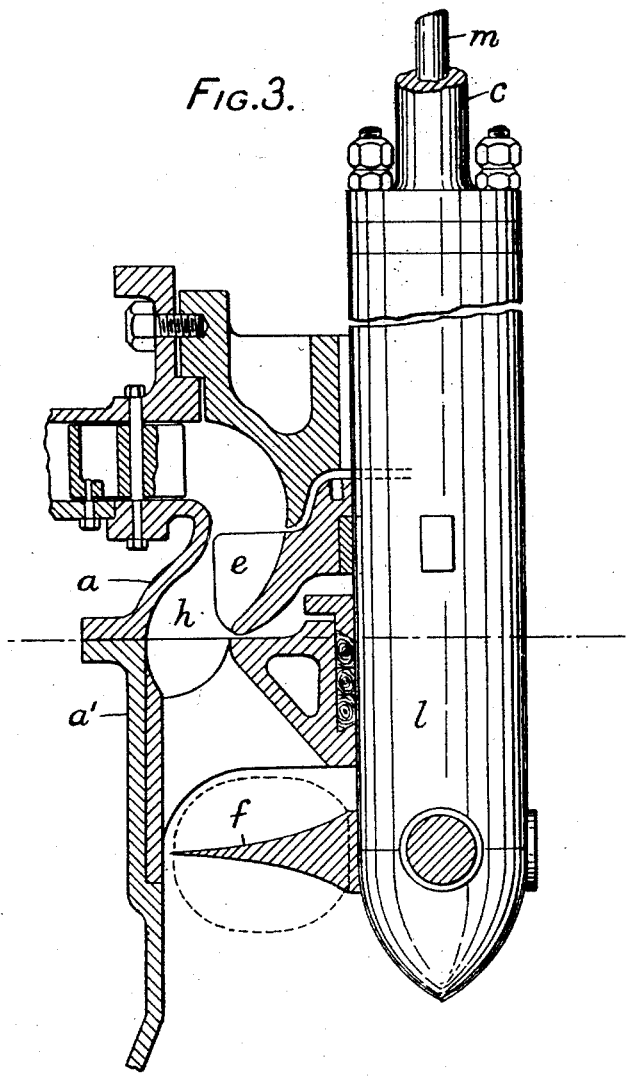
Fig. 3 is a sectional elevation of one half of a modified form of water turbine.

In Fig. 3 the upper blades $e$ are modified in shape and the pitch of the lower blades $f$ is capable of being adjusted in situ by suitable known mechanism housed in the elongated boss $l$ and acting on the roots of the blades, the adjusting mechanism being actuated by a rod $m$ passing through the rotor shaft $c$ which is made hollow for the purpose. A type of such an adjusting mechanism is to be found in the patent to Ring, 1,656,017 of January 10, 1928.

It will be understood that the water may be admitted to the turbine by way of a volute inlet chamber formed in the stator, said chamber communicating normally with the first half of the first set of runner blades. In such cases the gated inlet control could conveniently be replaced by means as described enabling the rotor to be traversed to control the running of the turbine.

As will be appreciated, the fixing and running blades have been shown in a purely diagrammatic way in the accompanying drawings and their number and the inclination and curvature thereof will in practice be such as are found to give the best results. The screw pitch of the runner blades may conveniently increase progressively from the top to the bottom of the rotor in order that the water which acquires an accelerating downward movement during its passage through the turbine may operate efficiently on all sets of runner blades.

I claim:

1. A water turbine comprising a stator and a rotor, the rotor having a plurality of sets of blades upon which the water is caused to act in succession, the rotor having an annular circumferential concave channel in its outer face within which the first set of blades is disposed, the stator being formed to provide discharge ports discharging water into the upper portion of said channel and below these discharge ports being formed to provide an annular depression in the internal face of the stator, the depression being longitudinally concave, the upper portion of the depression extending above the lower portion of the first set of blades, and the lower portion of the depression extending beyond the lowest ends of the first set of blades and extending inward and toward the second set of blades.

2. A water turbine comprising a stator and a rotor, the stator enclosing the rotor and fitting the rotor at the upper end of the latter, the rotor being formed to provide a lower set of blades, an upper circumferentially bladed depressed portion longitudinally concave and an inwardly extending portion below the circumferential depression and disposed above the lower set of blades, the stator being formed to provide ducts discharging water into the upper portion of the first named depressed portion and against said blades therein and immediately below said ducts extending upward approximately parallel to the lower wall of the first named depressed portion in the rotor and then extending downward and inward approximately parallel to the portion of the rotor immediately above the lower set of blades and directing water downward on to said lower set of blades.

3. A water turbine including a stator and a rotor, the rotor being provided with two sets of blades, the stator having inlet openings discharging upon the upper portion of said sets of blades, the stator and rotor being so formed as to cause the water to be discharged downward and given a gyratory movement with relation to the second set of blades, the blades of the second set being rotatively adjustable to change their angle.

4. A water turbine including a stator and a rotor, the upper portion of the stator being closed, the shaft of the rotor passing through the closed end of the stator, the stator below the upper end thereof having water inlet openings, the rotor being formed with a circumferential longitudinally concave channel into the upper portion of which said openings discharge water, angular blades disposed in said channel, the rotor below the channel extending downward and inward and the rotor having a second set of blades below this downwardly and inwardly extending portion, the stator being formed with a circumferential channel longitudinally concave, this channel overlapping the lower portion of the channel in the rotor, the lower portion of the channel in the stator extending downwardly and centrally, and means for reducing the pressure within the stator above the rotor whereby to support the axial thrust on the rotor.

In testimony whereof he has fixed his signature.

THOMAS THOMPSON.